United States Patent
Chukka et al.

(10) Patent No.: US 9,495,593 B2
(45) Date of Patent: Nov. 15, 2016

(54) METHOD AND APPARATUS FOR CONTROLLING CONTENT CAPTURE OF PROHIBITED CONTENT

(75) Inventors: Ravikiran Chukka, Beaverton, OR (US);
(Continued)

(73) Assignee: Intel Corporation, Santa Clara, CA (US)

( * ) Notice: Subject to any disclaimer, the term of this patent is extended or adjusted under 35 U.S.C. 154(b) by 81 days.

(21) Appl. No.: 13/995,141

(22) PCT Filed: Mar. 12, 2012

(86) PCT No.: PCT/US2012/028796
§ 371 (c)(1),
(2), (4) Date: Jun. 17, 2013

(87) PCT Pub. No.: WO2013/137855
PCT Pub. Date: Sep. 19, 2013

(65) Prior Publication Data
US 2014/0212051 A1 Jul. 31, 2014

(51) Int. Cl.
*G06K 9/00* (2006.01)
*G06F 21/62* (2013.01)
*G06F 21/83* (2013.01)

(52) U.S. Cl.
CPC ....... *G06K 9/00624* (2013.01); *G06F 21/6209* (2013.01); *G06F 21/83* (2013.01);
(Continued)

(58) Field of Classification Search
CPC ................. G06F 21/00; G06K 9/00624; G06T 1/60; H04N 5/225
See application file for complete search history.

(56) References Cited

U.S. PATENT DOCUMENTS 8,543,838 B1 * 9/2013 Au .................. G06F 21/602
713/190
8,566,186 B1 * 10/2013 Heit .................. G06Q 10/10
705/30
(Continued)

FOREIGN PATENT DOCUMENTS

| CN | 101571914 A | 11/2009 |
| KR | 10-2010-0127456 A | 12/2010 |
| KR | 10-2012-0006222 A | 1/2012 |

OTHER PUBLICATIONS

International Search Report and Written Opinion mailed Nov. 29, 2012 for International Application No. PCT/US2012/028796, 11 pages.
(Continued)

*Primary Examiner* — Stephen R Koziol
*Assistant Examiner* — Pinalben Patel
(74) *Attorney, Agent, or Firm* — Schwabe, Williamson & Wyatt, P.C.

(57) ABSTRACT

Embodiments of methods, apparatuses, and storage mediums associated with controlling content capture of prohibited content on remote devices, are disclosed. In embodiments, components of a remote device may receive image data of an image captured by the remote device and analyze the image data to determine whether the image includes prohibited content. In embodiments, the remote device may conditionally display or persistently store the image data, based at least in part on a result of the analysis.

24 Claims, 3 Drawing Sheets

(75) Inventors: Gyan Prakash, Beaverton, OR (US);
Rajesh Poornachandran, Portland, OR (US); Saurabh Dadu, Tigard, OR (US)

(52) U.S. Cl.
CPC .................. *G06F 2221/2115* (2013.01); *G06F 2221/2149* (2013.01)

(56) References Cited

U.S. PATENT DOCUMENTS

| | | | |
|---|---|---|---|
| 2003/0126267 A1 | 7/2003 | Gutta et al. | |
| 2004/0208361 A1* | 10/2004 | Buzuloiu et al. | 382/165 |
| 2007/0260603 A1* | 11/2007 | Tuscano | G06F 17/30867 |
| 2008/0012935 A1 | 1/2008 | Echtenkamp | |
| 2008/0226119 A1* | 9/2008 | Candelore et al. | 382/100 |
| 2009/0204580 A1* | 8/2009 | Seamon | G06F 17/30864 |
| 2009/0262390 A1 | 10/2009 | Tanaka | |
| 2011/0047388 A1* | 2/2011 | Park | G06F 21/6209 |
| | | | 713/189 |
| 2011/0267497 A1* | 11/2011 | Hickie | 348/231.7 |

OTHER PUBLICATIONS

International Preliminary Report on Patentability mailed Sep. 25, 2014 for International Application No. PCT/US2012/028796, 8 pages.

Extended European Search Report mailed Sep. 22, 2015 for European Application No. 12871478.9, 6 pages.

Office Action mailed Aug. 16, 2016 for European Application No. 12871478.9, 7 pages.

\* cited by examiner

METHOD AND APPARATUS FOR CONTROLLING CONTENT CAPTURE OF PROHIBITED CONTENT

CROSS REFERENCE TO RELATED APPLICATIONS

The present application is a national phase entry under 35 U.S.C. §371 of International Application No. PCT/US2012/028796, filed Mar. 12, 2012, entitled "METHOD AND APPARATUS FOR CONTROLLING CONTENT CAPTURE OF PROHIBITED CONTENT", which designated, among the various States, the United States of America. The Specification of the PCT/US2012/028796 Application is hereby incorporated by reference.

TECHNICAL FIELD

Embodiments relate to the field of imaging devices, in particular, to methods, apparatuses, and systems for displaying and/or storing images on imaging devices.

BACKGROUND ART

Imaging devices are prevalent in modern wired and/or wireless devices. For example, wireless mobile devices such as cell phones or smart phones typically include a digital camera as a standard feature. Laptops and/or desktop computers may include webcams. Unfortunately, the potential for misuse of this feature can be large. Sex offenders may use wireless mobile devices to send or receive sexually explicit photos or video messages. Teenagers may exchange sexually explicit video messages or photos with each other, engaging in what is now termed "sexting." Aside from removal of the various devices from the users, there appear to be few solutions for addressing the display, storage, and/or exchange of prohibited content using devices with imaging capability.

DESCRIPTION OF THE EMBODIMENTS

Figure 1:
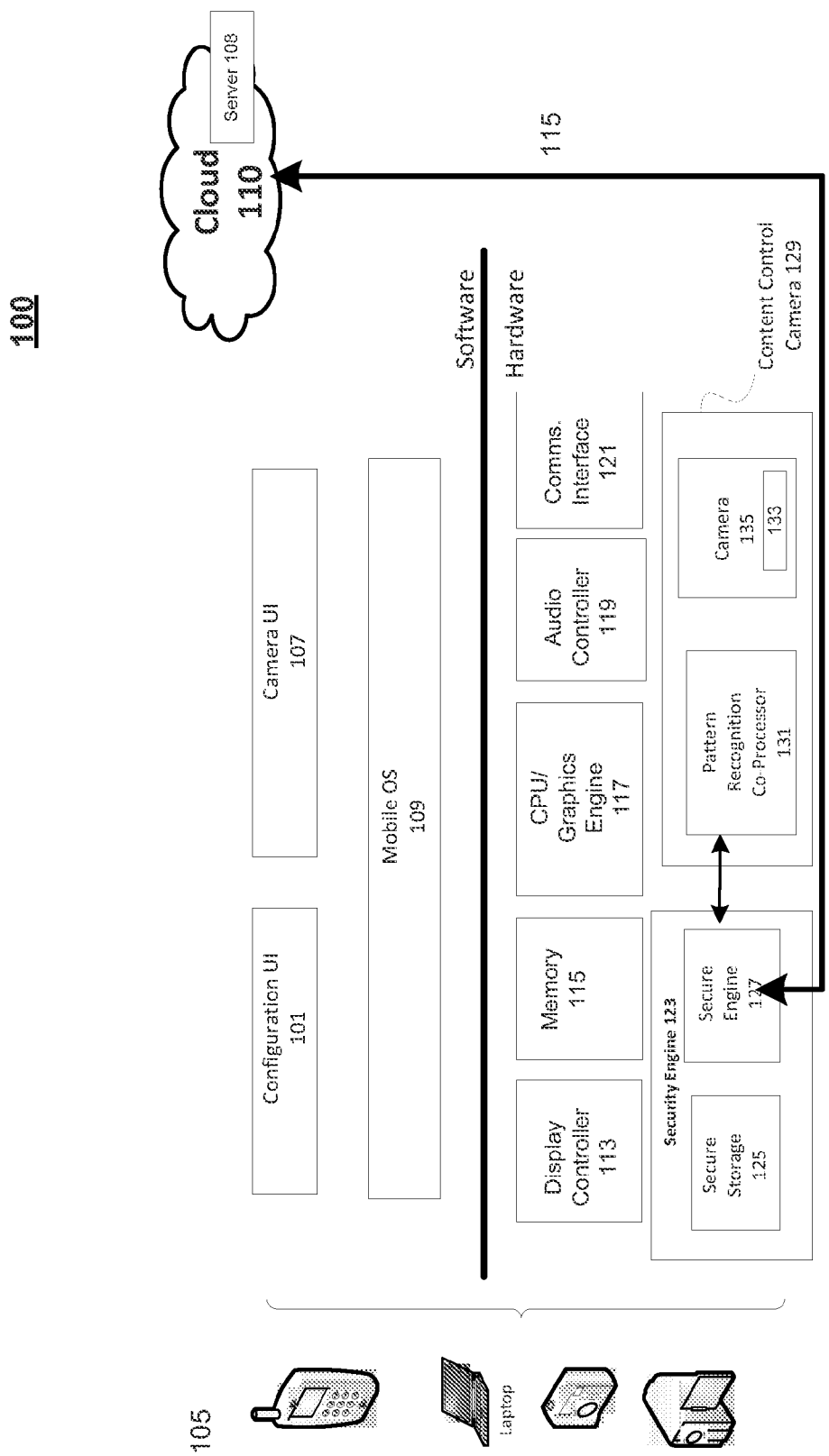
FIG. 1 is a block diagram that illustrates an example system including a remote device and a server in accordance with various embodiments.

Modern wired and/or wireless devices with imaging capability can be used for capturing prohibited content. Current solutions, however, may not block an image prior to display of the image or storage of image data on persistent storage, such as non-volatile storage, of the device. Nor do current solutions provide policy-based configurations or cloud-based support related to the prohibition of capturing prohibited content, and take actions based on policies. Furthermore, current solutions are purely software based. Software running on a device associated with analyzing image data, e.g. a remote wireless or wired device, may be insecure and vulnerable to hacking. Hereinafter, a remote wired or wireless device may simply be referred to as "remote device."

According to embodiments described below, patterns associated with prohibited content may be received by a secure engine in the remote device from a server or other computing device that is remotely disposed from the remote device or can be provisioned to the remote device securely during manufacturing. In embodiments, the server may periodically provide updated patterns to the secure engine. The patterns may be included in a profile including policy-based configurations related to a type of control to be implemented. In embodiments, policy-based configurations may allow the server to provide notifications to parents as well as duplex communication with parents with cloud support. In embodiments, profiles may be stored in a secure storage. In embodiments, both the secure engine and the secure storage may include a hardware component and be secure from tampering by a user, operating system and other software. In embodiments, the secure engine may provide the patterns associated with prohibited content to a co-processor coupled to a sensor of a camera of the remote device for analysis of the image data against the patterns stored in the secure storage and provide a result of the analysis to the secure engine. In embodiments, the secure engine may allow the remote device to conditionally display or persistently store the image data based at least in part on a result of the analysis or may send the data to a remote computing device such as a cloud server for further analysis or actions based on policy configurations.

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments. Specifics in the examples may be used anywhere in one or more embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

FIG. 1 is a simplified block diagram of an exemplary system 100 for controlling display and/or storage of prohibited content by a remote device such as a remote device 105 in accordance with various embodiments of the present disclosure. Note that although FIG. 1 illustrates a mobile or cellular phone, laptop, digital camera, and camcorder, remote device 105 may also include, for example, but not be limited to, a tablet device, a desktop computer, a personal digital assistant ("PDA"), or other device. In general, remote device 105 may have computing capabilities and in various embodiments, may be any form of device capable of communicating with a computing device, e.g. a remote server, such as a server 108 which may be included in cloud 110.

In embodiments, server 108 may operate in cloud 110 which may include a distributed computing environment that may include a plurality of remote devices 105, interconnected by a wireless network via a gateway to other networks to server 108. The connections and communications may be interconnected via suitable network connections using suitable network communications protocols. As will be appreciated by those of ordinary skill in the art, a computing device such as server 108 may reside on any device accessible by the remote device 105 shown in FIG.

1. It will also be appreciated that while server 108 of system 100 is illustrated as a single device, server 108 may actually comprise more than a single device in an actual system practicing embodiments of the present invention. An exemplary server 108 is shown in detail in FIG. 3.

As shown in FIG. 1, in the embodiment, remote device 105 may further include a communications interface 121 for connecting to servers or other computing devices such as may be included in cloud 110. In embodiments, communications interface 121 may include necessary circuitry, driver and/or transceiver for such a connection, and may be constructed for use with the appropriate protocols for such a connection. In the embodiment shown, remote device 105 may also include a configuration user interface ("UI") 101, a camera UI 107 and a device operating system (OS), e.g. mobile OS 109. For the embodiment, remote device 105 may also include a display controller 113, memory 115, central processing unit (CPU) 117, and audio controller 119, each including a hardware component and interconnected along with the communications interface 121 via a link (not shown). For the embodiment, audio controller 119 may be configured to generate audio signals and control audio input/output for remote device 105.

In embodiments, remote device 105 may further include a security engine 123 and a content control camera 129. In the embodiment, content control camera 129 may include a pattern recognition co-processor 131 ("co-processor 131") and camera 135 including a sensor 133. In embodiments, security engine 123 may include a secure storage 125 and a secure engine 127. Those of ordinary skill in the art and others will appreciate that the remote device 105 may include many more components than those shown in FIG. 1. However, it is not necessary that all of these generally conventional components be shown in order to disclose an enabling embodiment for practicing the present invention.

An exemplary communication interaction shown in FIG. 1 may include server 108 of cloud 110 transmitting patterns associated with prohibited content along a path denoted by arrow 115 to secure engine 127 according to an embodiment. Note that, although not shown, in embodiments, path 115 may include a path to remote device 105 through communications interface 121. In embodiments, secure engine 127 may save the patterns associated with the prohibited content to secure storage 125. Note that in embodiments, a processor is a component of secure engine 127 and is configured to operate independently of a primary operational environment operated by a primary processor of remote device 105, and the image is captured by the primary operational environment.

In embodiments, secure engine 127 may retrieve the patterns associated with the prohibited content patterns and provide the patterns to co-processor 131. In embodiments, security engine 123 provides hardware-based tamper proof secure execution and storage independent of CPU 117.

Note that in embodiments, information may also flow upstream from secure engine 127 to server 108. In various embodiments, policy-based configurations may be set according to various user preferences/settings via configuration UI 101. In embodiments, access to user preferences/settings in configuration UI 101 may be protected by a user password. In some embodiments, a configuration UI may be accessed on a second remote device by a third party, such as a parent or an employer. In embodiments, configuration UI 101 may allow a user, e.g. a parent, to set user preferences/settings related to notification and/or subscriptions. In embodiments, user preferences/settings may control validation such as enabling the control of display of images and/or persistent storage of image data as well as features related to notification. For example, in an embodiment, a parent may select a preference for notification each time an image or image data on their child's remote device is found to include patterns associated with prohibited content. In embodiments, secure engine 127 may transmit data related to an occurrence or multiple occurrences of such events to server 108. In embodiments, server 108 or other computing device of cloud 110 may subsequently or in real time transmit a message including the notification to the second remote device. In embodiments, duplex communication between server 108 and the second remote device may be provided with cloud support.

In embodiments, remote device 105 may capture image data of an image via a sensor 133 of camera 135. In embodiments, camera 135 may provide the image data to co-processor 131 which may analyze the image data to determine whether the image includes prohibited content. In embodiments, co-processor 131 may analyze the image data to determine whether the image has one or more patterns consistent with one or more patterns associated with the prohibited content. In embodiments, the co-processor may analyze the image data to determine whether the image has one or more patterns consistent with one or more patterns in a prohibited content by application of a pattern matching algorithm to the image data and patterns in prohibited content. In embodiments, co-processor 131 may analyze the image data against patterns associated with a prohibited content stored in secure storage 125. In embodiments, if the result of the analysis is that the image has a pattern that is consistent with a pattern associated with the prohibited content, co-processor 131 may notify secure engine 127. In embodiments, security engine 123 may have a capability to block the image and send a notification to OS 109 that the image cannot be displayed due to violation of policy.

Figure 2:
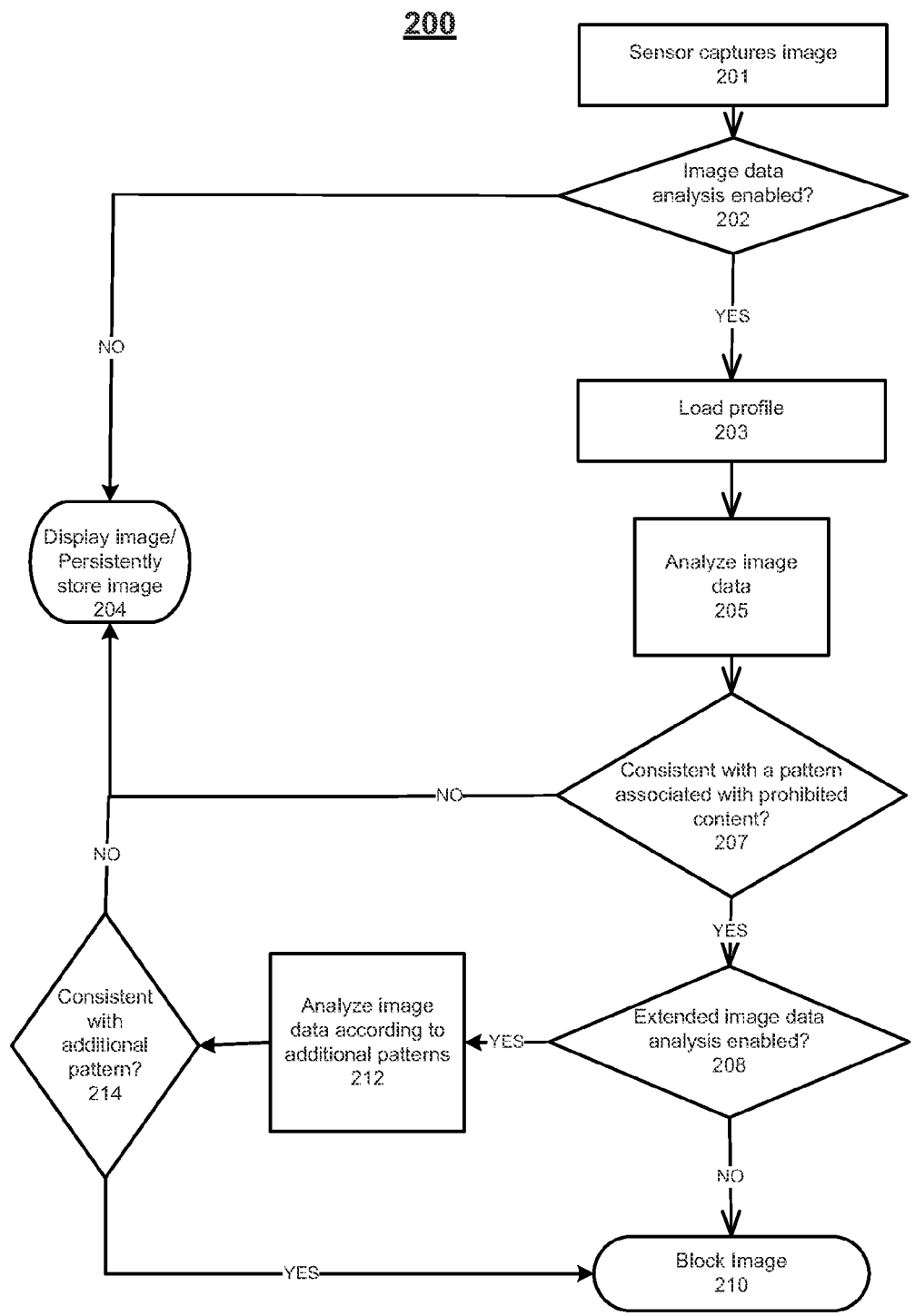
FIG. 2 is a flow diagram in accordance with an embodiment.

FIG. 2 illustrates a flow diagram 200 in accordance with one embodiment. For the embodiment, beginning at a block 201, sensor 133 of camera 135 may capture an image when a user attempts to take a picture. In embodiments, camera 135 may process image data of the image. In embodiments, camera 135 may perform digitization and image enhancement operations on the image data, such as for example, correcting for contrast, blur, or noise. Camera 135 may also in embodiments perform image segmentation and image representation. At a next decision block 202, firmware running on secure engine 127 may check policy in secure storage 125 to determine if image data analysis is enabled. In embodiments, image data analysis may or may not be enabled in accordance with user preferences/settings set through configuration UI 101. If image data analysis is not enabled, then in an embodiment, the flow moves to a next block 204 where the image may be displayed on the remote device 105 or stored in a persistent storage, such as a flash drive. In embodiments, security engine 123 may instruct a mobile OS 109 (or more specifically, a display or graphics driver of the OS) to proceed to cause the image to be displayed.

If, however, at decision block 202, the image data analysis is enabled, the answer, is YES and the flow may move to a block 203. In the embodiment, at block 203, secure engine 127 may load a profile from secure storage 125. In embodiments, the profile may include patterns associated with prohibited content as well as policy-based configurations. In embodiments, secure engine 127 may have received the profile and/or updates to the profile from cloud 110 for storage in secure storage 125. Thus, in an embodiment, secure engine 127 may provide, in an embodiment, relevant patterns associated with prohibited content to co-processor 131. Next, in embodiments, at a next block 205, co-processor 131 may use patterns associated with prohibited content to analyze the image data. In embodiments, at a decision block 207, if the image does not have one or more patterns associated with prohibited content, the answer is NO and the image may be displayed or persistently stored at block 204.

If, however, at decision block 207, the answer is YES, and the image does have one or more patterns associated with prohibited content, in an embodiment, the flow may move to a next decision block 208. At decision block 208, in the embodiment, secure engine 127 may check the profile to determine if extended image data analysis is enabled. Note that in some embodiments, extended image data analysis may be associated with an additional subscription purchased by a user to allow more complex or additional analysis of the image data. If extended image analysis is not enabled, the answer is NO and the flow ends at a block 210, where the image is blocked from display or a persistent storage of image data. Note that in various embodiments, configuration UI 101 of FIG. 1 may render a message on a display or display unit of remote device 105 about the pattern match detection and its consequence. In an embodiment, the message may inform the user that the image is being blocked due to prohibited content. In embodiments, the message may inform the user that a password or additional credentials may be required to access the profile in the configuration UI 101 if it is desired to allow a display of the image or persistent storage of the image data.

Returning to block 208, if extended image analysis is enabled, however, the flow may move to block 212 where co-processor 131 may analyze the image data further to determine whether the image includes patterns consistent with one or more additional patterns associated with prohibited content. At a next decision block 214, if the image does not include a pattern consistent with one or more additional patterns, the process terminates at block 204 where the image may be displayed or image data persistently stored. In an embodiment, if the image includes a pattern consistent with an additional pattern at decision block 214, the image is blocked from display or persistent storage at end block 210.

Note that, an order of operations of flow diagram 200 has been presented only as an example. In other embodiments, a different order of operations and/or various processes may be omitted or added as suitable. Note that in an embodiment, analyzing the image data to determine whether the image includes prohibited content comprises transmission of the image data to a remote analysis server, and receiving in response a result indicating whether the image includes prohibited content. In embodiments, remote analysis server may include server 108 of FIG. 1 or computer system 300 described below. Note that in embodiments, for a remote device without communication capability, patterns may be programmed at manufacturing time and may not be dynamically changeable.

Figure 3:
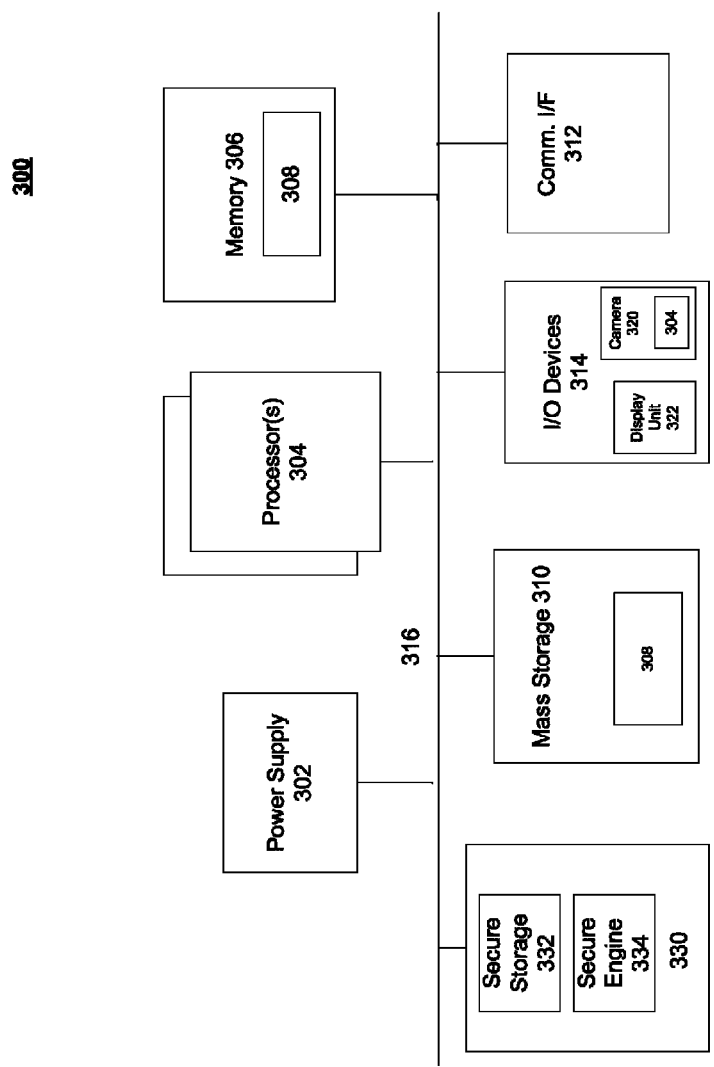
FIG. 3 illustrates an example computing system/device suitable for use as a remote device and/or server in accordance with various embodiments.

FIG. 3 illustrates an example computing system/device suitable for use as a remote device or remote server in accordance with various embodiments. As shown, computer system 300 may include a power supply unit 302, a number of processors or processor cores 304, a memory 306 having processor-readable and processor-executable instructions 308 stored therein, a mass storage device 310 that may also store the instructions 308, and a communication interface 312. For the purpose of this application, including the claims, the terms "processor" and "processor cores" may be considered synonymous, unless the context clearly requires otherwise. In embodiments, the computer system 300 may also comprise input/output (I/O) devices 314 and a display unit 322. In embodiments suitable for use as a remote device, I/O devices 314 may include a digital camera 320. In various embodiments, I/O devices 314 may also include a keyboard, cursor control, and so forth, suitably scaled in some embodiments for use in a wireless device or in other embodiments, for a server. In various embodiments, digital camera 320 may include a sensor that may be configured to capture images as described in accordance with FIGS. 1-2. In embodiments, display unit 322 may be configured to render images captured by the sensor in camera 320. In embodiments, display unit 320 may also include display configuration UI 101 and/or camera UI 107 of FIG. 1.

In embodiments, computer system 300 may also include a security engine 330. The security engine 330 may include a secure storage 332 and a secure engine 334. In one embodiment, secure engine 334 may be a cryptographic engine. In embodiments, firmware running in secure engine 334 may program a co-processor 304 located in camera 320 to notify secure engine 334 of a result of an application of a pattern matching algorithm. In embodiments, the one or more mass storage devices 310, secure storage 332, and memory 306 may comprise a tangible, non-transitory machine-readable storage device (such as a diskette, hard drive, compact disc read only memory (CDROM), hardware storage unit, and so forth). Thus, embodiments may include at least one non-transitory machine-readable storage medium having stored thereon, instructions configured to, in response to execution of the instruction by a processor of an apparatus, enable the apparatus to receive image data of an image captured by the apparatus, analyze the image data to determine whether the image includes prohibited content, and conditionally display or persistently store the image data, based at least in part on a result of the analysis.

The various elements of FIG. 3 may be coupled to each other via a secured communication pathway 316, which may represent a multi-drop bus or a point-to-point interconnect. In the case of multiple buses, they may be bridged by one or more bus bridges (not shown). Data may pass through the system bus 316 through the I/O devices 314. The memory 306, mass storage device 310, and secure storage 332 may be employed to store a working copy and a permanent copy of the programming instructions implementing firmware modules or drivers.

Thus, in various embodiments, system 300 includes a processor 304, a memory 306 coupled to the processor, a communication interface 312 coupled with processor 304, and instructions stored in memory 306 and configured to be executed by the processor 304, to assist a device, remotely disposed from the system 300, in determination of whether an image captured by the device includes prohibited content.

In embodiments, a method of capturing an image includes receiving, by a processor, image data of an image captured by a camera of a device, analyzing, by the processor, the image data to determine whether the image includes prohibited content; and causing, by the processor, the image to be conditionally displayed or the image data to be persistently stored on the device, based at least in part on a result of the analysis. In embodiments, analyzing by processor, the image data to determine whether the image includes prohibited content includes analyzing the image data in accordance with a policy-based configuration. In embodiments, the policy-based configuration indicates one or more particular pattern type to be used in analyzing the image data. In embodiments, causing, by the processor, the image to be conditionally displayed or the image data to be persistently stored includes causing the image to be conditionally displayed or the image data to be persistently stored in accordance with the policy-based configuration. In embodiments and as described above, the policy-based configuration can be updated dynamically. In embodiments, the policy-based configuration may be set according to various user preferences/settings. Furthermore, in embodiments, based upon the policy-based configuration, if a match between the image data and a pattern is detected, a notification or alert may be sent to a second wireless device for approval of the image to be displayed.

Furthermore, embodiments may include at least one machine-readable storage medium which include instructions that may enable an apparatus to, in response to execution of the instructions by a processor of an apparatus, receive image data of an image captured by the apparatus. In embodiments, in accordance with the instructions, the apparatus may analyze the image data to determine whether the image includes prohibited content, and conditionally display or persistently store the image data, based at least in part on a result of the analysis. In embodiments, analyzing the image data may include analyzing the image data to determine whether the image has one or more patterns consistent with one or more patterns associated with a prohibited content. In embodiments, the at least one machine-readable storage medium of may include instructions that cause the apparatus to analyze the image data to determine whether the image has one or more patterns consistent with one or more patterns associated with a prohibited content comprises analyze the image data against patterns in a prohibited content stored in the apparatus. In an embodiment, the instructions may be configured to enable the apparatus to receive the patterns associated with a prohibited content, and store the patterns associated with the prohibited content in secure storage of the apparatus. In embodiments, instructions to analyze the image data to determine whether the image includes prohibited content may include transmission of the image data to a remote analysis server, and receive in response a result indicating whether the image includes prohibited content. In embodiments, analyzing the image data to determine whether the image has one or more patterns consistent with one or more patterns associated with a prohibited content comprises application of a pattern matching algorithm to the image data and patterns in a prohibited content. In embodiments, the processor may be a component of a secure engine of the apparatus. Furthermore, in an embodiment, the secure engine may be configured to operate independently of a primary operational environment operated by a primary processor of the apparatus, where the image is captured by the primary operational environment.

Embodiments may include an apparatus for capturing images comprising a sensor, a processor coupled to the sensor and configured to receive image data of an image captured by the apparatus. The processor may also be configured to analyze the image data to determine whether the image includes prohibited content and cause a conditional display or persistent storage of the image data, based at least in part on a result of the analysis. In embodiments, the processor is configured to analyze the image by determining whether the image has one or more patterns consistent with one or more patterns associated with a prohibited content. In embodiments, the apparatus includes a processor that is configured to analyze the image by analyzing the image data against patterns associated with a prohibited content stored in a secure storage in the apparatus. In embodiments, the apparatus further comprises a security engine configured to receive the patterns associated with a prohibited content and to store the patterns associated with a prohibited content in secure storage of the apparatus. In embodiments, the security engine is a cryptographic engine. In embodiments, the processor is configured to analyze the image data to determine whether the image includes prohibited content by application of a pattern matching algorithm to the image data and patterns associated with a prohibited content. Furthermore, in embodiments, the processor is configured to block a display of the image if it is determined that the image includes prohibited content.

In embodiments, a system may comprise a processor, a memory coupled to the processor, a communication interface coupled with the processor, and instructions stored in the memory and configured to be executed by the processor, to assist a device, remotely disposed from the system, in determination of whether an image captured by the device includes prohibited content. In an embodiments, the instructions to assist the device comprise instructions to enable the system to provide to the device via the communication interface, patterns associated with a prohibited content. In embodiments, the instructions to assist the device comprise instructions to analyze image data received from the device for prohibited content and to enable the system to transmit a result of the analysis to the device. In embodiments, the instructions to analyze image data for prohibited content includes instructions to apply a pattern matching algorithm to the image data and patterns associated with a prohibited content. Furthermore, in embodiments, the instructions to assist the device further comprise instructions to notify a second device, remotely disposed from the system, of results of the application of the pattern matching algorithm. In embodiments, the instructions to assist the device further comprise instructions to block a display of the image on the device.

In embodiments, a system for capturing images comprises a processor, and a memory coupled to the processor and the memory including a computer readable medium having instructions to cause the system, in response to execution by the processor, to receive image data of an image captured by the system, analyze the image data to determine whether the image includes prohibited content, and cause a conditional display on a display of the system or persistent storage of the image data, based at least in part on a result of the analysis. In embodiments, in the system, the instructions to cause the conditional display include instructions to block a display of the image if it is determined that the image includes prohibited content. In embodiments, the system may further comprise a sensor coupled to the processor and configured to receive the image data.

The remaining constitution of the various elements of the computer system 300 is known, and accordingly will not be further described in detail. The above description of illustrated embodiments, including what is described in the Abstract, is not intended to be exhaustive or to be limited to the precise forms disclosed. Specifics in the examples may be used anywhere in one or more embodiments. While specific embodiments and examples are described herein for illustrative purposes, various modifications are possible. For example, as noted previously, the order of operations of flow diagram 200 of FIG. 2 has been presented only as an example. In other embodiments, a different order of operations and/or various processes may be omitted or added in the spirit of the embodiments. These and other modifications can be made in light of the above detailed description. The terms used in the following claims should not be construed to be limited to the specific embodiments disclosed in the specification.

The invention claimed is:

1. At least one non-transitory machine-readable storage medium having stored thereon instructions that, in response to execution by a processor of an apparatus, cause the apparatus to:
receive image data of an image captured by the apparatus;
analyze the image data to determine whether the image includes prohibited content;
conditionally display or determine not to persistently store the image data, based at least in part on a result of the analysis; and
in response to a determination not to persistently store the image data, send a notification that the image includes prohibited content, wherein the notification is sent after the determination not to persistently store the image data to be viewed by a user of a remote device other than the apparatus;
wherein the apparatus is a tablet, mobile phone, or laptop; and
wherein the processor is a component of a secure cryptographic engine of the apparatus, the secure cryptographic engine is to operate independently of a primary operational environment operated by a primary processor of the apparatus and to be secure from tampering by a user or processes operating in the primary operational environment outside of the secure cryptographic engine, and the image is captured by the primary operational environment.

2. The at least one non-transitory machine-readable storage medium of claim 1, wherein analyze the image data comprises analyze the image data to determine whether the image has one or more patterns consistent with one or more patterns associated with a prohibited content.

3. The at least one non-transitory machine-readable storage medium of claim 2, wherein analyze the image data to determine whether the image has one or more patterns consistent with one or more patterns associated with a prohibited content comprises analyze the image data against patterns in a prohibited content stored in the apparatus.

4. The at least one non-transitory machine-readable storage medium of claim 3, wherein the instructions are further to, in response to execution by the processor, cause the apparatus to receive the patterns associated with a prohibited content, and store the patterns associated with the prohibited content in secure storage of the apparatus.

5. The at least one non-transitory machine-readable storage medium of claim 1, wherein analyze the image data to determine whether the image includes prohibited content comprises transmission of the image data to a remote analysis server, and receive in response a result indicating whether the image includes prohibited content.

6. The at least one non-transitory machine-readable storage medium of claim 2, wherein analyze the image data to determine whether the image has one or more patterns consistent with one or more patterns associated with a prohibited content comprises application of a pattern matching algorithm to the image data and patterns in a prohibited content.

7. An apparatus for capturing images, comprising:
a sensor;
a non-volatile storage device;
a processor, coupled to the sensor and to the non-volatile storage device, to:
receive image data of an image captured by the apparatus using the sensor;
analyze the image data to determine whether the image includes prohibited content;
determine not to cause persistent storage of the image data in the non-volatile storage device, based at least in part on a result of the analysis; and
send a notification that the image includes prohibited content, wherein the notification is sent after determination not to persistently store the image data to be viewed by a user of a remote device other than the apparatus;
wherein the apparatus is a tablet, mobile phone, or laptop; and
wherein the processor is a component of a secure cryptographic engine of the apparatus, the secure cryptographic engine is to operate independently of a primary operational environment operated by a primary processor of the apparatus and to be secure from tampering by a user or processes operating in the primary operational environment outside of the secure cryptographic engine, and the image is captured by the primary operational environment.

8. The apparatus of claim 7, wherein the processor is to analyze the image by determining whether the image has one or more patterns consistent with one or more patterns associated with a prohibited content.

9. The apparatus of claim 8, wherein the processor is to analyze the image by analyzing the image data against patterns associated with a prohibited content stored in a secure storage in the apparatus.

10. The apparatus of claim 7, further comprising a security engine to receive the patterns associated with a prohibited content and to store the patterns associated with a prohibited content in secure storage of the apparatus.

11. The apparatus of claim 7, wherein the processor is to analyze the image data to determine whether the image includes prohibited content by application of a pattern matching algorithm to the image data and patterns associated with a prohibited content.

12. The apparatus of claim 11, wherein the processor is to block a display of the image if it is determined that the image includes prohibited content.

13. A system for capturing images, comprising:
a processor;
a non-volatile storage device; and
a memory coupled to the processor and the memory including a computer-readable medium having instructions to cause the system, in response to execution by the processor, to:
receive image data of an image captured by the system;
analyze the image data to determine whether the image includes prohibited content;
determine not to cause persistent storage of the image data in the non-volatile storage device, based at least in part on a result of the analysis; and
send a notification that the image includes prohibited content, wherein the notification is sent after determination not to persistently store the image data to be viewed by a user of a remote device other than a device including the system;
wherein the system is included in a tablet, mobile phone, or laptop; and
wherein the processor is a component of a secure cryptographic engine of the system, the secure cryptographic engine is to operate independently of a primary operational environment operated by a primary processor of the system and to be secure from tampering by a user or processes operating in the primary operational environment outside of the secure cryptographic engine, and the image is captured by the primary operational environment.

14. The system of claim 13, wherein the instructions are to further cause a conditional display, include instructions to block a display of the image if it is determined that the image includes prohibited content.

15. The system of claim 13, further comprising a sensor coupled to the processor to receive the image data.

16. A method of capturing an image, comprising:
receiving, by a processor of a device, image data of an image captured by a camera of the device, wherein the device is a tablet, mobile phone, or laptop;
analyzing, by the processor, the image data to determine whether the image includes prohibited content; and
determining, by the processor, not to cause the image data to be persistently stored in a non-volatile storage device of the device, based at least in part on a result of the analysis; and
sending a notification that the image includes prohibited content;
wherein the processor is a component of a secure cryptographic engine of the device, the secure cryptographic engine is to operate independently of a primary operational environment operated by a primary processor of the device and to be secure from tampering by a user or processes operating in the primary operational environment outside of the secure cryptographic engine, and the image is captured by the primary operational environment; and
wherein the device is a first device and the notification is sent after the determination not to persistently store the image data to be viewed by a user of a remote second device other than the first device.

17. The method of claim 16, wherein analyzing, by the processor, the image data to determine whether the image includes prohibited content includes analyzing the image data in accordance with a policy-based configuration.

18. The method of claim 17, wherein the policy-based configuration indicates one or more particular pattern type to be used in analyzing the image data.

19. The method of claim 17, wherein the policy-based configuration may be set according to various user preferences/settings.

20. The method of claim 18, wherein the notification is sent to the second device for approval of the image to be displayed.

21. The at least one machine-readable storage medium of claim 1, wherein the instructions are further to, in response to execution by the processor, cause the apparatus to not display the image upon capture of the image.

22. The apparatus of claim 7, wherein the processor is further to not display the image upon capture of the image.

23. The system of claim 13, wherein the instructions are further to, in response to execution by the processor, cause the system to not display the image upon capture of the image.

24. The method of claim 16, further comprising:
preventing, by the processor, display of the image upon capture of the image.

* * * * *